United States Patent [19]
Smith et al.

[11] Patent Number: 5,736,249
[45] Date of Patent: Apr. 7, 1998

[54] NON-STICK POLYMER-COATED ARTICLES OF MANUFACTURE

[75] Inventors: John Ralph Smith, Gansevoort, N.Y.; Nissim N. Garti, Jerusalem, Israel

[73] Assignee: Decora, Incorporated, Fort Edward, N.Y.

[21] Appl. No.: 291,091

[22] Filed: Aug. 16, 1994

[51] Int. Cl.$^6$ ............................................. B32B 15/08
[52] U.S. Cl. ...................... 428/447; 428/413; 428/414; 428/416; 428/418; 428/421; 428/422; 428/423.1; 428/425.1; 428/425.6; 428/425.8; 428/428; 428/429; 428/448; 428/450; 428/451; 428/452; 428/481; 428/482
[58] Field of Search .......................... 428/413, 414, 428/415, 416, 418, 421, 422, 423.1, 425.1, 425.6, 425.8, 428, 429, 447, 448, 450, 451, 452, 481, 482

[56] References Cited

U.S. PATENT DOCUMENTS

| | | | |
|---|---|---|---|
| 4,113,665 | 9/1978 | Law et al. | 260/375 B |
| 4,282,054 | 8/1981 | Mattor et al. | 156/289 |
| 5,039,745 | 8/1991 | Riddle | 525/101 |
| 5,192,603 | 3/1993 | Slater et al. | 428/217 |
| 5,314,731 | 5/1994 | Yoneda et al. | 428/429 |
| 5,415,935 | 5/1995 | Pankratz | 428/352 |

*Primary Examiner*—D. S. Nakarani
*Attorney, Agent, or Firm*—Hedman, Gibson & Costigan, P.C.

[57] ABSTRACT

Articles of manufacture are provided with a low surface energy, permanently non-stick, non-fouling and ice-phobic surface by a system of coating comprising applying a primary coating having a surface energy of 22–28 dynes/cm$^2$ comprising a novel polymeric material having non-stick and hardness properties and then applying a top coating having lower surface energy of from about 18–21 dynes/cm$^2$ comprising a siliconic polymer and interdigitating means to make the top coating permanent, the means preferably comprising a bi- or polyfunctional organic compound adapted to wet the surface of the primary coating and chemically or physically bond thereto and to couple to the siliconic polymeric substance in the top coating. The coated substrates are resistant to marking by graffiti, to adherence by marine fouling organisms, and frozen ice on the surface is easily removed.

18 Claims, 3 Drawing Sheets

NON-STICK POLYMER-COATED ARTICLES OF MANUFACTURE

This invention relates to polymer-coated articles of manufacture and to a process for coating substrates to produce such articles with coating materials which provide permanent low surface energy surfaces, and anti-sticking, anti-fouling and ice-phobic characteristics.

BACKGROUND OF THE INVENTION

Inorganic, organic and metallic substrates, such as glass, ceramics, concrete, plastics, iron and steel, aluminum and the like in three-dimensional shapes are used in many industries, such as packaging lines, construction of bridges, offshore drilling, oil and gas production, land, marine and air transportation, water and waste treatment, petrochemical production, agriculture, the manufacture of plastics, pulp and paper, the generation of power, and the like. The shapes can comprise sheets, drilling and processing piping, ship hulls, airplane parts, such as propellers and wings, highway and building girders, storage tanks, printing and paper machine rollers, and the like. Such shapes are routinely coated with polymers for a number of reasons, e.g., to impart water- and stain resistance; to decorate them; to improve ease of maintenance; to reduce friction; and the like. Less common, but no less important, reasons to polymer-coat substrates are to reduce sticking; e.g., of graffiti to glass, wood and ceramic tile; to reduce fouling, e.g., by marine organisms, such as by zebra mussels, algae and the like in marine tankers, inlet piping in power generation plants, and the like; and to provide easy removal of ice, e.g., from refrigeration equipment and the leading edges of airplane wings, stabilizers and propellers.

Illustrative of the state of the art of polymer-coating of such substrates is Law, et al., U.S. Pat. No. 4,113,665, who describe a binder curable at room temperature to produce chemically resistant coating for improving the resistance to corrosion, chemicals, solvents, weather and heat of steel structures used in chemical processing plants, oil refineries, coal fired power plants, offshore drilling platforms, and petroleum tankers. The binder comprises a silicone resin and a trialkoxy silane reacted with a polyol. Such coatings are useful to provide corrosion resistance, but they do not provide non-stick, foul-release and ice-phobic properties, for reasons not clearly understood at this time. It is believed that, in spite of the presence therein of silicone compounds, coatings made from such binders do not have a low enough surface energy to provide such characteristics, even for a short period on time, and especially not permanently.

Riddle, U.S. Pat. No. 5,039,745, describe a non stick coating composition for easing the removal of graffiti and sticky labels from buildings, the composition comprising a silicone resin, a poly(tetrafluoroethylene) resin and a polyurethane polymer in combination. The composition is said to resist removal by aggressive solvents, but it does not possess a low enough surface energy to permanently resist attack by marine organisms and to lower the resistance to ice removal substantially below values which are ordinarily achieved with the best state-of-the-art ice-phobic polymeric coatings, e.g., polypropylene, which itself is higher than desired at 60 lbs./in$^2$.

Also of interest in this connection, is Mattor, et al., U.S. Pat. No. 4,282,054, who describe a composition for providing a release sheet for making laminates coated with a composition comprising a release agent, a cross-linkable thermoplastic resin and a water dispersible organic compound, some of which are surface active agents, containing polyoxyethylene, polyoxypropylene or a block copolymer thereof. The release agents used generally comprise a chrome complex of a fatty acid. Although the coating is described to be hard and smooth, and useful to preventing sticking of urethanes and polyvinyl chloride resins cast against sheets covered with it, the material is not easy to apply, requiring heating for curing, and it does not appear to be useful as an permanent anti-fouling coating and ice-phobic coating possibly because it does not possess a low enough surface energy and/or a contact angle (water) of 85° to 99°, preferably above 90°.

It has now been found that all of the shortcomings of the prior art are overcome according to the present invention if there is used a system comprising a primary coating having a surface energy in the range of 22 to 28 dynes/cm$^2$ on the substrate and if there is interdigitated into the primary coating a top coating which has an even lower surface energy, of the order of 18 to 21 dynes/cm$^2$. Interdigitation as used herein and in the appended claims defines using a means to interlock, e.g., like the fingers of folded hands, or couple, the two coatings together at their interface using, for example, a bi- or polyfunctional molecule one end of which interdigitates, or partially dissolves or chemically bonds to the primary layer and the other end of which binds to the non-stick polymer or prepolymer, either physically or chemically, and producing permanence not only to non-sticking but also to foul-releasing and ice-phobic characteristics. Such a novel system has been found to result in vast improvements in both the permanency and the efficiency of the foul-releasing and the ice-phobic properties, the former maintaining more than 10 months of effectiveness in sea water, and the latter reducing the removal resistance of ice on aluminum substrates to the order of 10 lbs/in$^2$.

SUMMARY OF THE INVENTION

It is an object of the invention to provide a composite coated substrate that is hydrophobic, and has a permanent non-stick, foul-release, and ice-phobic surface;

It is another object of the invention to provide a method to produce such a composite coated substrate without the need to use heat curing and which reduces the energy needed to remove marine bio-fouling organisms, or ice on aircraft outer surfaces.

Still another object of the invention to provide buildings, and other structures with a composite coating to which graffiti do not adhere.

These and other objects are achieved according to the present invention by providing a coated article of manufacture having permanent non-stick, foul-release and ice-phobic surface characteristics, the article comprising:

(a) an inorganic, organic or metallic substrate;

(b) a hydrophobic primary coating on the substrate, the primary coating comprising one or more layers of a polymeric material having non-stick, hydrophobic or semi-hydrophobic, and hardness characteristics and a surface energy in the range of from about 22 to about 28 dynes/cm$^2$; and, (c) a hydrophobic top coating on the primary coating, the top coating comprising
   (i) a monomeric or polymeric siliconic material adapted to provide a surface energy of from about 18 to about 21 dynes/cm$^2$; and
   (ii) interdigitating means for coupling the top coating to the primary coating.

Also provided by the present invention are processes for producing coated articles as defined above, the processes comprising:

(A) applying to and curing on (a) an inorganic, organic or metallic substrate, (b) a hydrophobic primary coating, the primary coating comprising one or more layers of a polymeric material having non-stick, hydrophobic or semi-hydrophobic, and hardness characteristics and a surface energy in the range of from about 22 to about 28 dynes/cm$^2$; and (B) applying to and curing on the primary coating, (c) a hydrophobic top coating comprising
  (i) a monomeric or polymeric siliconic material adapted to provide a surface energy of from about 18 to about 21 dynes/cm$^2$; and
  (ii) interdigitating means for coupling the top coating to the primary coating.

Also contemplated by the present invention are hydrophobic primary organic coatings (b) for (a) an inorganic, organic or metallic substrate, the primary coating comprising the residue obtained by drying a composition comprising an aqueous emulsion of
  (b)(i) a prepolymeric- or polymeric material for imparting hydrophobic, lubricous and non-stick characteristics, and
  (b)(ii) a prepolymeric- or polymeric material for imparting adhesion and hardness properties; optionally,
  (b)(iii) a curing agent for a prepolymeric material; and, optionally,
  (c) a pigment, and curing the dried residue until it develops non-stick, hydrophobic or semi-hydrophobic, and hardness characteristics, and a surface energy in the range of from about 22 to about 28 dynes/cm$^2$.

In addition, the present invention also provides hydrophobic top coatings (c) for application to an inorganic, organic or metallic substrate coated with the primary coating as immediately above defined, the top coating comprising
  (c)(i) a monomeric or polymeric siliconic material adapted to provide a surface energy of from about 18 to about 21 dynes/cm$^2$; and
  (c)(ii) interdigitating means for coupling said top coating to the primary coating, to thereby produce a permanent non-stick, foul-release and ice-phobic surface of the substrate.

Special mention is made of preferred features of the coated substrates, the processes and the coatings as above-defined, specifically, those wherein the substrate comprises glass, ceramic, concrete, wood, a polymer, a metal or a combination of one or more of the foregoing; those wherein the hydrophobic or semi-hydrophobic primary coating has a non-stick release adhesion of about 20 g/in. by TAPPI 502; an ultimate contact angle (water) of 85° to 99° by goniometer; and a pencil hardness of up to 2H to 3H (scratch) and up to 3H to 4H (gouge) by ASTM D3363; those wherein the primary coating comprises:
  (b)(i) a polymeric or pre-polymeric material for imparting hydrophobic, lubricous and non-stick characteristics, and
  (b)(ii) a polymeric or pre-polymeric material for imparting hardness and adhesion properties; those wherein the polymeric or pre-polymeric material (b)(i) comprises a siliconic material, a perfluoropolymeric material, a poly(vinyl fluoride) polymeric material, or a combination of any of the foregoing and the polymeric or pre-polymeric material (b)(ii) comprises an epoxy polymeric material, a polyurethane polymeric material, an alkyd polymeric material, or a combination of any of the foregoing; those wherein the polymeric or pre-polymeric material (b)(i) and said polymeric or pre-polymeric material (b)(ii) in the primary coating comprise polymerized units in a block copolymer, especially an interpenetrating network block copolymer; those wherein the hydrophobic top coating (c) comprises (i) a siliconic compound having organic functional groups for enhancing hydrophilicity and for reacting with the interdigitating means and (ii) the interdigitating means comprises a bi- or poly-functional chemical compound adapted to bind to the primary coating (b) by mechanical interdigitation and to bind to the siliconic compound (c)(i) by physical or chemical interaction and thereby to couple compound (c)(i) to primary coating (b); those wherein the siliconic compound (c)(i) comprises a polymer of the general formula:

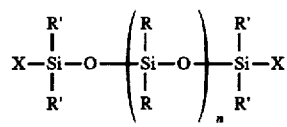

wherein R is a hydrocarbyl group, of, e.g., 1 to 30 carbon atoms, R' is alkyl or alkoxy, X is a hydrocarbyl group, e.g., of 1 to 8 carbon atoms or an organic reactive site, such as silicon-bonded hydrogen, alkoxyl, hydroxyl, halo, amino, and the like, and n is a number sufficiently high, e.g., from 5 to 1500, preferably, from 25 to 500, to provide that the polymer is a fluid or a water dispersible solid at 25° C.; those wherein the bi- or poly-functional compound (c)(ii) comprises a surface coupling agent adapted to provide efficient wetting of the primary coating (b), when top coating (c) is applied from a liquid, a paste, an aqueous solution or a dispersion, and the surface coupling agent is adapted to provide chemical or physical interdigitation of the top coat (c) on the primary coat (b); and those wherein the surface coupling agent comprises a dialkyl ester of a sodium or potassium sulfosuccinic acid, an alkyl amide sulfonate, an alkyl sulfonate ($C_{10}$–$C_{16}$) of sodium, potassium or ammonium, a mono- or di-ester of a medium chain alkyl phosphate, an ethoxylated alcohol ($C_8E_2$; $C_{10}E_4$; $C_{10}E_6$; $C_{12}E_8$; $C_{16}E_9$), an alkyl- or aryl-sulfonate, a fatty ester sulfonate, a fluorosurfactant, or a mixture of any of the foregoing

DETAILED DESCRIPTION OF THE INVENTION

The primary coating can comprise one or more resins, with the following criteria for selection: The polymeric material will have non-stick, hydrophobic or semi-hydrophobic and hardness properties. It will have a surface energy on to range of from about 22 to about 28 dynes/cm$^2$. It will be deposited as a liquid or paste, or from an organic or aqueous medium. By "hydrophobic" is meant exhibiting a contact angle (water) of above 90, and especially above 90° and by "semi-hydrophobic" is meant exhibiting a contact angle (water) of greater than 85 but less than 90°. Non-stick means having a release adhesion of less than about 50 g/in. by a standard test, specifically, Technical Association of the Paper and Pulp Industries (TAPPI) Test Method 502. Hardness characteristics are exhibited in terms of pencil hardness of greater than at least about 1H (scratch) and up to 3H (gouge) by a standard test, specifically, American Society of Testing Materials (ASTM) Test D3363.

Figure 1:
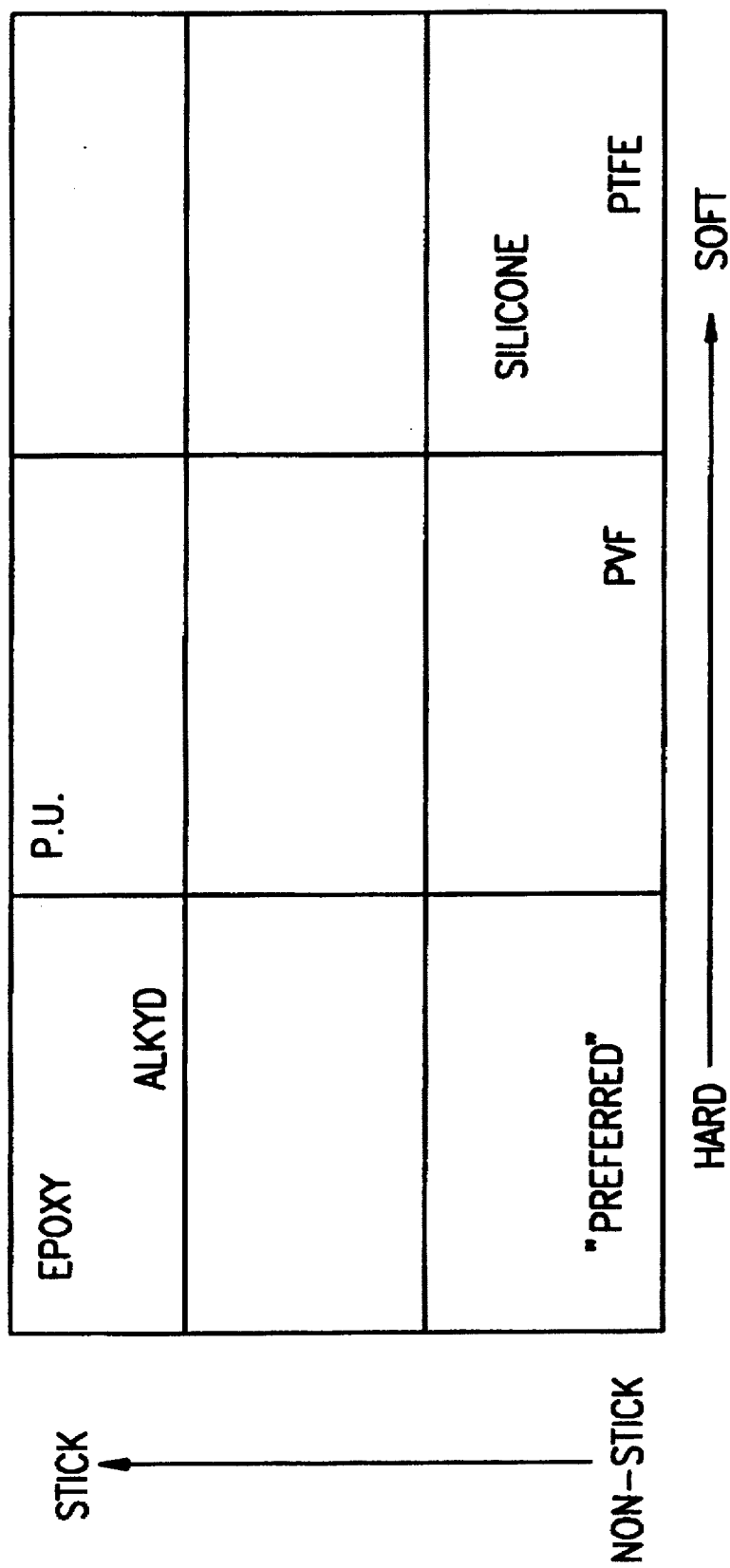
FIG. 1 is a graphical representation of the polymeric materials and their hard/soft and stick/non-stick characteristics showing the area in the lower left corner found to be suitable for selection of the primary coating materials for the present invention.

Those skilled in the art of coating substrates will be familiar with such characteristics and be able to select resin systems having any predetermined required properties. In any event, the graph shown in FIG. 1 will be helpful in understanding the characteristics required for the primary coat: If (in landscape orientation) a line is drawn to connect the upper left and the lower right corners, any polymeric material which falls below the line will be generally suitable, and materials which are in the block forming the lower left of the graph, including the "PREFERRED" system, will be best. The polymeric system can comprise blends of resins selected from many different types, so long as the blend has the required degree of hardness and non-stick properties. The polymeric system can also comprise copolymers, including graft copolymers, and particularly block copolymers in which the blocks can impart, respectively, non-stick and hardness. In addition, specific mention is made of a form of block copolymers known in the art as interpenetrating polymer networks. The blends, copolymers and network polymers can be prepared by those skilled in this art by known methods using the above-specified Test Methods to determine those which numerous trials have shown to be suitable for the present invention. Merely by way of illustration and not limitation, FIG. 1 shows that poly(vinyl fluoride) (PVF), silicone, and polytetrafluoroethylene have soft and non-stick characteristics. The graph also shows that epoxy, alkyd and polyurethane (P.U.) resins have hardness and adhesion (stick) properties. It follows then that blending from 1 to 99 parts, preferably from 25 to 75 parts, by weight of one or more of the former and correspondingly from 99 to 1 parts, preferably from 75 to 25 parts, by weight of the latter will produce an additive effect of hard/soft and stick/non-stick properties which will give a point on the graph which will be on, above or below a line connecting the upper left and lower right corners of FIG. 1. Furthermore copolymers containing blocks of the respective polymeric units will also give data points on the graph. Finally interpenetrating polymer networks of such copolymers will also do so, for example a network obtained by mixing emulsions of silicone and epoxy prepolymers and curing the prepolymer with a polyamine will give characteristics which are indicated by the legend "PREFERRED" in the extreme lower right of FIG. 1. and provide optimum results in the primary coatings of the present invention. So too, will interpenetrating polymer networks of polyvinyl fluoride or polytetrafluoroethylene and alkyd resins or polyurethane resins polymerized from prepolymers in the intimate presence of the former.

The coating of substrates comprises covering with layers of such polymeric materials by application in conventional ways, and curing. Preferably, the method used will depend on the nature of the substrate. Merely by way of illustration, if a liquid medium, such as an aqueous emulsion is used, and a hard surface is to be covered with a primary coat, the following guidelines will apply: adhesion and long term performance are enhanced by proper surface preparation. All surfaces must be completely degreased before abrasive preparation commences to insure proper wet out of water base coatings. All loose flake and powder must be eliminated. The minimum abrasive preparation is as follows: Steel and other metal surfaces: SSPC 10/NACE 2 with 2 to 3 mil blast profile; fiberglass: brush blast repair any damage to gel coat; wood and plastics: sand with 120 grit paper; concrete: remove all loose particulate and powder. The coatings are conveniently applied with commercial spray systems, preferably an airless system. Good techniques require that all rough or pitted areas, edges, corners and projections must be "striped" with a paint brush. The use of foam brushes and rollers for hand application is recommended. Coatings are normally applied to 4 to 5 mils thickness in one multipass spray coat. To cope with more corrosive conditions, it is recommended to use at least two undercoats. Typically, the coatings will be applied at a conventional solids content of 40 to 60% by weight and the coverage at 4 mils thickness will be about 165 ft$^2$. Water is preferably used to adjust the viscosity, if necessary; the typical drying times are 2 hours at 25° C.; and the compositions will completely cure in 5 days at 25° C. If the primary coating is to be applied from an emulsion, which is preferred, in accordance with conventional practice, the emulsion must be protected from freezing. Suitable compositions and formulations for the primary coating will be exemplified in the working examples which follow.

The primary coating provides useful properties to the substrate, and also serves as a suitable base for the permanent top coat which confers the highest non-stick, non-foul and ice-phobic properties. The primary coat presents a surface which is very useful to apply as a maintenance coating for machinery used to manufacture paper, textiles and packaging over a wide temperature range, wet or dry. The hydrophobic surface of the primary coat results in low biofouling adhesion and is especially effective to provide easy release of zebra mussels, quagga mussels and many bacterial and algal bioforms. The primary coating also makes it easy to clean or remove fouling by ice, tar, grease and other potential contaminates. The primary coating also provides above and below water performance and surface protection in both fresh and salt water environments and thereby extends the life of steel, iron, aluminum, concrete and the like.

The top coating can vary in nature and content, so long as it is hydrophobic and comprises a monomeric or polymeric siliconic compound which produces a surface energy of from about 18 to about 21 dynes/cm$^2$ and a means to couple to siliconic compound to the primary coat. The top coat can be applied from a melt, it can be applied as a paste of the components, it can be applied from an organic medium or, preferably it can be applied from an aqueous medium. It can also be wiped onto the primary coating, much like a polish, and even monomolecular layers are surprisingly effective. In any event the interdigitating means should serve two functions: it should penetrate the surface of the primary coat and lock into it either chemically or physically, and it should lock into the siliconic resin either chemically or physically, similarly to the well known technique of using a functional silane to couple resins to a glass filler. The interdigitating means will therefore preferably be a chemical compound and, especially preferably, it will be a di- or polyfunctional compound, one end of which will wet and interdigitate with the primary coating and the other end of which will react physically or chemically with the siliconic compound component of the top coat, as is shown schematically in FIG. 2.

Figure 2:
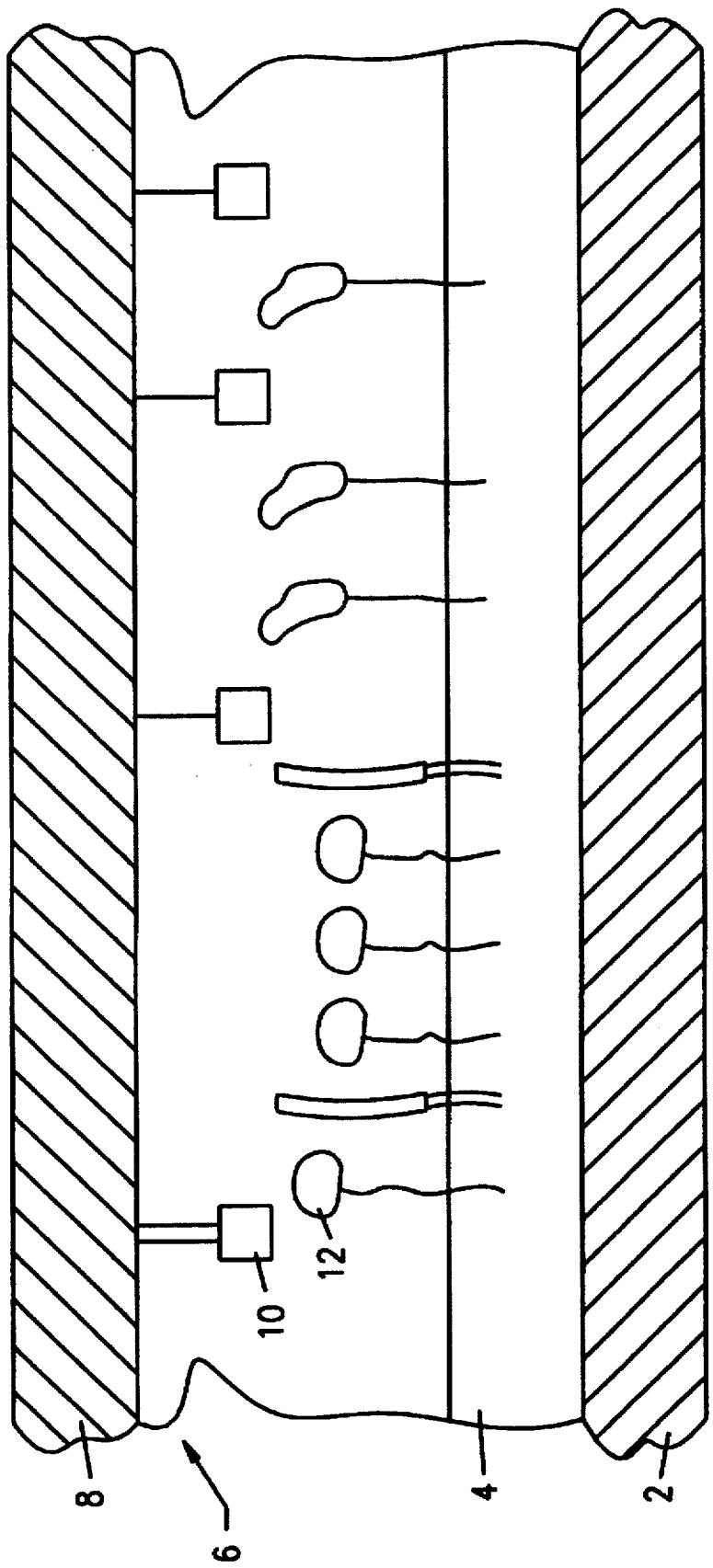
FIG. 2 is a schematic sectional view through the substrate, the primary coating, and the top coating of an article of manufacture according the present invention, showing how the interaction of the interdigitating means with the primary coat and with the siliconic polymer in the top coat couples the two coats together to provide permanent non-stick properties.

In FIG. 2, bottom layer 2, represents a cross section of the substrate, e.g., metal, wood, plastics, and the like, on which is deposited primary coat 4, which comprises, for example, an interpenetrating network of silicone/epoxy block copolymer and which has a surface energy of 23 dyne/cm$^2$. Coupled to the primary coating is a topcoating 6 comprising a siliconic polymer 8 and a wetting and coupling agent 10 which interacts with active functional groups in the siliconic polymer and with the polymeric material 12 in the primary coating 4. By this process, called "interdigitation", the properties of the siliconic resin provide the substrate with permanent non-stick properties, very useful to remove graffiti, highly effective foul-release, very useful to prevent zebra mussels from contaminating the surface, and highly effective ice-phobic properties, very useful to de-ice aircraft wings, stabilizers, and the like.

The top coat can comprise a family of silicone fluids that combine the physical chemistry of poly(alkyl siloxanes) with or without functional groups, such as hydroxyl, alkyl, siloxyl, amino, carboxyl, halo, and the like, that add anchoring sites to the backbone siliconic polymer. Almost any silicone polymer can be selected and the selection will be dictated if the end use requires water resistance, abrasion resistance, mold release properties and weatherability, and selection is within the knowledge of those skilled in the art. Preferred siliconic polymers will meet the formulae set forth above. Illustratively, a polydiorgano siloxane linear polymer containing hydrogen, hydroxyl, alkoxyl or other functional groups can be used. Polydiorganosilicone fluids can also be used, but they are less preferred, because they are somewhat less permanent.

The interdigitating compounds should have, as mentioned, excellent wetting properties for the hydrophilic primary coating. Those skilled in the art will be able to select useful such compounds. Merely by way of illustration can be mentioned, carboxylates, such as ethoxy carboxylates; phosphate esters, such as dialkyl pyrophosphates and alkyl ether phosphates; sulfate esters, such as sodium lauryl sulfate; sulfated monoglycerides, sulfonates of unsaturated acids, such as oleic acid, and sulfosuccinates; ethoxylated alcohols, such as $C_8E_2$. More specifically, the following can be used as interdigitating agents: the diamyl, dihexyl or dioctyl esters of sodium sulfosuccinic acid (e.g., Aerosol® AY or AT), alkamide sulfonate (Aldkamide® 2122) ammonium lauryl sulfate, octyl phenol ethoxylate (Alkasurf® ALS or OP-12), phosphate esters, fatty ester sulfate (Atlas® WA-107), sodium n-decyl sulfate (Avirol® 110), sodium long chain alcohol sulfate (Avitex® AD), ethoxylated alcohol (Carbopen® Arkansas, Co.), PEG-400 dilaurate (CPM-79N), butyl naphthalene sodium sulfonate (Emkal® BNS), propylene glycol monoricinoleate (Flexricin® NL Chemical), fluorochemical surfactants (Fluorad® 3M Co.)

The amount of interdigitating means used in the top coat will vary, suitable amounts being, e.g., from about 1 to about 60 parts by weight per 99 to 40 parts by weight of the siliconic component in the top coat composition. A 50:50 ratio is convenient to mix and apply. Application can be by brushing, spraying, dipping and the like. If a liquid medium is used to facilitate application, the liquid is allowed to evaporate over any suitable length of time, and the top coat can be dried by conventional means and allowed whatever time in suitable for curing. Sometimes an excess of the interdigitating means will leach out, but this is acceptable behavior and does not detract from the effectiveness or the permanence of the top coating. The final top coat film thickness can vary, but usually it is in the range of 0.02 to 6 milli-inches, and preferably from 0.05 to 1 milli-inches, and especially useful are monolayers which usually are below 0.1 milli-inches thick.

Conventional additives can be included in the coating compositions of the invention in the usual amounts for their desired purposes, such as pigments or other colorants, matting and flatting agents, viscosity enhancers gloss enhancers, stabilizers, and the like.

DESCRIPTION OF THE PREFERRED EMBODIMENTS

The invention is described in further detail by the following examples.

To evaluate hydrophobicity, water repellency of the surface, surface energy and contact angle with other polar solvents like water, the coated substrates are subjected to the following test method to determine contact angle and surface energy: The contact angle (O) of water, glycerol, thioglycerol and methylene iodide with the coated surface is measured with a goniometer and plotted against the surface tension of the respective solvent. The Cos theta of the surface at best spreading is taken from the graph and the surface energy of the coating is calculated. The values obtained are set forth in the examples which follow.

To evaluate the release (non-stick) properties of the coatings, a standard test method (TAPPI-UM 502) is used. A 1"×1" strip of Johnson and Johnson Red Cross® waterproof tape is adhered to stainless steel as a reference and to the coated surface to be tested and compared. The samples are aged (24 hours at 70° C.) and the force required to remove the tape from the surfaces is measured with either a Keil Tester or an Instron Tester. The results are set forth in the examples which follow. The control surface (uncoated stainless steel) has a measured release force of 400 g/in.

Figure 3:
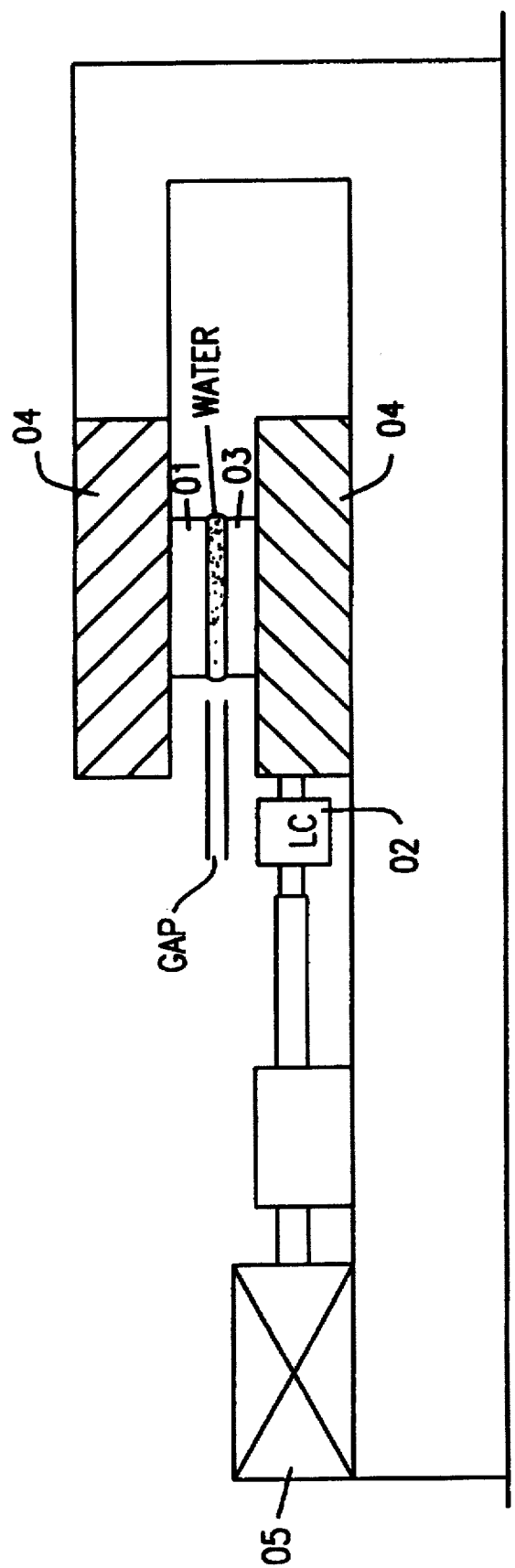
FIG. 3 is a schematic cross sectional view of an apparatus for testing the force required to shear ice frozen in a gap between metallic specimens, one of which is coated with a polymeric material for evaluation as an ice-phobic surface.

To evaluate the ice-phobic properties of the coatings, a test method employing an apparatus as is shown in FIG. 3 is used. An uncoated specimen 01 is placed above the surface coated specimen 03 and one drop of water is placed in the gap between the specimens. The sandwich is placed between freezing elements 04, the lower one of which is fixed to load cell 02, and to driving mechanism 05. The water is frozen by passing refrigerant through closed passageways, not shown, in freezing elements 04 and, after the water is frozen, the drive is actuated to effect a shearing stress between the samples measurable with either a Keil Tester or an Instron Tester. The shear force is transmitted by load cell 02 to the tester and the output thereafter transmitted to a graphical recorder which produces a plot of the shear force required to separate the specimens by rupturing the frozen drop of water. As a point of reference, when neither of the metal samples is coated, the shear stress is typically greater than 200 lbs/in$^2$. The results of such testing are set forth in the examples which follow.

EXAMPLE 1

Substrates comprising 4 inch×8 inch cold rolled steel Q-Panels are surface prepared to SSPC 10 by sandblasting, then are spray coated with 4.0 mil DFT (dry film thickness) of a freshly mixed primer composition comprising 100 parts of A and 22 parts of B of the following formulations:

| | Parts by Weight |
|---|---|
| Component A | |
| Epoxy silicone based emulsion | 40 |
| 2-Propoxy ethanol | 4 |
| Water | 56 |
| Component B | |
| Polyamines solution | 55 |
| 2-Propoxy ethanol | 30 |
| Methyl alcohol | 15 |

This coat is cured at 23° C. for 24 hours, then is spray coated to 4.0 mils DFT with a freshly mixed pigmented composition comprising 100 parts of A, 8.75 parts of X and 17.5 parts of B of the following formulations:

| | Parts by Weight |
|---|---|
| Component A | |
| Epoxy silicone based emulsion | 54 |
| 2-Propoxy ethanol | 5 |
| Water | 41 |
| Component B | |
| Polyamines solution | 55 |
| 2-Propoxy ethanol | 30 |
| Methyl alcohol | 15 |
| Component X | |
| Propanol | 0.50 |
| Methanol | 0.25 |
| Pigment (Blue) | 13.00 |
| Water | 86.25 |

This coat is cured at ambient temperature, minimum 20° C. for 7 days to produce a substrate having thereon a smooth uniform pigmented primary coating in accordance with the present invention. The surface energy of the coating is 23 dynes/cm$^2$, which is useful specifically to substantially weaken bio-adhesion and eases removal and clean-up where organisms are able to successfully lodge. If ice is frozen in the gap the between the surfaces of aluminum discs, one of which is coated and the other is not, and then a shearing stress is applied using an apparatus as shown schematically in FIG. 3, the energy to release is about 40 psi, which is a significant improvement over the 60 psi required for polyolefin-coated aluminum substrates. Furthermore, spray paint does not stick to the coated surfaces and the magic marker ink used by graffiti artists wipes off.

Testing in accordance with known procedures demonstrate the results set forth in Table 1:

TABLE 1

Steel Substrates with 8 mil Primary Coating

| Parameter | Method | Result |
|---|---|---|
| Pencil Hardness-Scratch | ASTM D3363 | Up to 2 H |
| Pencil Hardness-Gouge | ASTM D3363 | Up to 3 H |
| Non-stick Release | TAPPI 502 | 20 g/in |
| Adhesion | | |
| Contact Angle (water) | DTM (goniometer) | 99° |

The prime-coated substrates prepared as described are next provided with brushed on top coat in accordance with the present invention by mixing the following formulation:

| Component | Parts by Weight |
|---|---|
| Linear polydimethyl siloxane fluid (1% silanol groups) | 50 |
| polyoxyethylene (20)-sorbitan mono-oleate (Tween ® 80) | 50 |

The last listed component acts to interdigitate and couple the fluid to the primary coating giving the substrate a permanent surface having a surface energy of 19 dynes/cm$^2$. If ice is frozen in the gap between an uncoated aluminum disc and an aluminum disc coated with such a surface and then sheared in the apparatus if FIG. 3, the release energy required is vastly reduced to 8 and 12 psi. Furthermore, the coating remains effective as a foul release for marine organisms, especially barnacles and zebra mussels, for 10 months in sea water, and there is no reduction in shear resistance after 40 cycles of freezing, shearing, refreezing and reshearing in the apparatus used for the ice-phobic test. Graffiti do not adhere to this coating for many months after exposure to the outdoor environment. These tests show the surprising permanence of the top coating and permanence is also retained if the coating is applied in a monomolecular layer simply by wiping on the primary coat, rather than by brushing.

EXAMPLE 2

The procedures of Example 1 are repeated on concrete as the substrate. The concrete is prepared by washing with high pressure water to remove salts, silts, existing biofouling and other foreign matter. Any dust which remains is removed by blast cleaning or brushing. The primary coat is allowed to cure to produce a smooth covered surface. The finish coat of the primary coating is applied to a dry film thickness of 4 mils. This provides zebra mussel control. Zebra mussel control is made permanent by applying the top coating as described in Example 1. The coating is also long lasting when the system is applied to provide the concrete with anti-graffiti and ice-phobic characteristics.

EXAMPLE 3-8

Panels coated with the primary coating, panels coated only with the top coating and panels coated with both the primary and the top coating in accordance with Example 1 are cured, respectively, at room temperature, 23° C. for 10 days (RT) and at 300° F. for 15 minutes (300° F.). The contact angles against water (W), glycerol (G) and methylene iodide (I) are measured with a goniometer and the data are plotted and converted to surface energy values by the test method set forth above. The results obtained are set forth in Table 2:

TABLE 2

Steel Substrates with Primary and/or Top Coating

| Ex. | Coat | Cure | O$^W$ | O$^G$ | O$^I$ | Surface Energy (dynes/cm$^2$) |
|---|---|---|---|---|---|---|
| 3 | Primary | RT | 78 | 74 | 0 | 54 |
| 4 | Primary | 300° F. | 89 | 81 | 0 | 50 |
| 5 | Top | RT | 93 | 68 | 0 | 45 |
| 6 | Top | 300° F. | 96 | 80 | 0 | 43 |

TABLE 2-continued

| | | Steel Substrates with Primary and/or Top Coating | | | | |
|---|---|---|---|---|---|---|
| Ex. | Coat | Cure | $O^W$ | $O^G$ | $O^I$ | Surface Energy (dynes/cm$^2$) |
| 7 | Pri + Top | RT | 99 | 68 | 0 | 45 |
| 8 | Pri + Top | 300° F. | 101 | 85 | 0 | 40 |

All surfaces were hydrophobic with very low surface energy.

The Patents and any publications and test methods cited hereinabove are incorporated herein by reference.

While there have been described what are presently believed to be preferred embodiments of the invention, it will be apparent to a person skilled in the art that numerous changes can be made in the ingredients, conditions and proportions set forth in the foregoing embodiments. Instead of a steel or concrete substrate, one comprising ceramic tile, polyurethane, epoxy, poly(vinyl chloride), polycarbonate, aluminum, rubber, and the like, can be used. Instead of an interpolymer of silicone and epoxy, a blend of silicone and polyurethane, alkyd resin, or the like, can be used in the primary coating, or a blend of polytetrafluoroethylene or polyvinylfluoride and epoxy resin can be used in the primary coating. Instead of a hydroxy-functional silicone fluid, a methoxy functional silicone fluid or a non-functional group containing poly(dimethylsiloxane) fluid can be used in the top coating. Instead of the Tween® polysorbate 80 used as the interdigitating agent in the top coat, the top coat can comprise an emulsified mixture of the siliconic material and a diamyl ester of sodium sulfosuccinic acid, an octyl phenol ethoxylate, a fatty ester sulfate, a fluorochemical surfactant, a mixture of any of the foregoing, or the like. Instead of room temperature curing, curing can be carried out at 300° F. for 15 minutes. The hardness goes up by 1 pencil hardness unit to 3H (scratch) and to 4H (gouge), and the contact angle increases from 87° to 95° (Example 1). The coating compositions have also been found to provide glass with a graffiti-resistant surface that resists the ablative effects of outdoor exposure. All such obvious modifications can be employed without departing from the invention as described herein and as defined in the appended claims.

What we claim is:

1. A coated article of manufacture having permanent non-stick, foul-release and ice-phobic surface characteristics, said article comprising:

(a) an inorganic, organic or metallic substrate;

(b) a hydrophobic primary coating on said substrate, said primary coating comprising one or more layers of a polymeric material having non-stick, hydrophobic or semi-hydrophobic properties and a pencil hardness of greater than about 1H (scratch and up to 3H (gouge) by ASTM D3363 and a surface energy in the range of from about 22 to about 28 dynes/cm$^2$; and, (c) a hydrophobic top coating on said primary coating, said top coating comprising (i) a monomeric or polymeric siliconic material adapted to provide a surface energy of from about 18 to about 21 dynes/cm$^2$ said siliconic compound having organic functional groups for enhancing hydrophilicity and for reacting with an interdigitating means; and (ii) interdigitating means for coupling said top coating to said primary coating, said interdigitating means comprising a bi- or poly-functional chemical compound adapted to bind to the primary coating (b) by mechanical interdigitation and to bind to the siliconic compound (c)(i) by physical or chemical interaction and thereby to couple compound (c)(i) to the primary coating (b), said bi- or poly-functional compound (c)(ii) comprising a surface coupling agent adapted to provide efficient wetting of said primary coating (b), when top coating (c) is applied from a liquid, a paste, an aqueous solution or a dispersion, and said surface coupling agent is adapted to provide chemical or physical interdigitation of the top coating (c) on the primary coating (b) and wherein said surface coupling agent comprises a dialkyl ester of a sodium or potassium sulfosuccinic acid, an alkyl amide sulfonate, a $C_{10}$–$C_{16}$ alkylsulfonate of sodium, potassium or ammonium, a mono- or di-ester of an alkyl phosphate, an ethoxylated alcohol, $C_{8-16}$ fatty alcohol having 2 to 9 ethoxy groups an alkyl- or aryl-sulfonate, a fatty ester sulfonate, a fluorosurfactant, or a mixture of any of the foregoing and wherein the primary and top coating are applied to the substrate without heat curing.

2. A coated article as defined in claim 1, wherein said substrate comprises glass, ceramic, concrete, wood, a polymer, a metal or a combination of one or more of the foregoing.

3. A coated article as defined in claim 1, wherein said hydrophobic or semi-hydrophobic primary coating has a non-stick release adhesion of about 20 g/in. by TAPPI 502; and an ultimate contact angle (water) of from 85° to 99° by goniometer.

4. A coated article as defined in claim 3 wherein said primary coating comprises:

(b)(i) a polymeric or pre-polymeric material for imparting hydrophobic, and non-stick characteristics, and (b)(ii) a polymeric or pre-polymeric material for imparting hardness and adhesion properties.

5. A coated article as defined in claim 4, wherein said polymeric or pre-polymeric material (b)(i) comprises a siliconic material, a perfluoropolymeric material, a poly (vinyl fluoride) polymeric material, or a combination of any of the foregoing and said polymeric or pre-polymeric material (b)(ii) comprises an epoxy polymeric material, a polyurethane polymeric material, an alkyd polymeric material, or a combination of any of the foregoing.

6. A coated article as defined in claim 4 wherein said polymeric or pre-polymeric material (b)(i) and said polymeric or pre-polymeric material (b)(ii) in the primary coating comprise polymerized units in a block copolymer.

7. A coated article as defined in claim 6 wherein said polymeric or pre-polymeric material (b)(i) and said polymeric or pre-polymeric material (b)(ii) in the primary coating comprise polymerized units in an interpenetrating network block copolymer.

8. A coated article as defined in claim 1 wherein said siliconic compound (c)(i) comprises a polymer of the general formula:

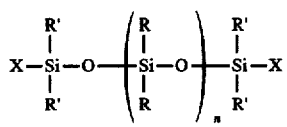

wherein R is a hydrocarbyl group, R' is alkyl or alkoxy, X is hydrocarbyl or an organic reactive site, and n is a number sufficiently high to provide that the polymer is a fluid or a water dispersible solid at 25° C.

9. A coated article as defined in claim 1 wherein the interdigitating means is polyoxyethylene (20)—sorbitan mono-oleate.

10. A coated article as defined in claim 1 wherein the interdigitating means is a diamyl ester of sodium sulfosuccinic acid.

11. A coated article as defined in claim 1 wherein the interdigitating means is an octyl phenol ethoxylate.

12. A coated article as defined in claim 1 wherein the interdigitating means is a fatty ester sulfate.

13. A coated article as defined in claim 1 wherein the interdigitating means is a fluorosurfactant.

14. A coated article as defined in claim 1 wherein said primary coating comprises a block copolymer obtained by mixing an emulsion of silicone and epoxy prepolymers and curing the prepolymers with a polyamine.

15. A coated article as defined in claim 1 wherein said primary coating comprises a block copolymer obtained from polyvinyl fluoride or polytetrafluoroethylene prepolymers and alkyd resins or polyurethane resins.

16. A coated article of manufacture having permanent non-stick, foul-release and ice-phobic surface characteristics, said article comprising:

(a) an inorganic, organic or metallic substrate;

(b) a hydrophobic primary coating on said substrate, said primary coating comprising a block copolymer obtained by mixing an emulsion of silicone and epoxy prepolymers and curing the prepolymers with a polyamine having non-stick properties and a pencil hardness of greater than about 1H (scratch) and up to 3H (gouge) by ASTM D3363 and a surface energy in the range of from about 22 to about 28 dynes/cm$^2$; and, (c) a hydrophobic top coating on said primary coating, said top coating comprising (i) a monomeric or polymeric siliconic material adapted to provide a surface energy of from about 18 to about 21 dynes/cm$^2$ said siliconic compound having organic functional groups for enhancing hydrophilicity and for reacting with an interdigitating means; and (ii) interdigitating means for coupling said top coating to said primary coating said interdigitating means comprising a dialkyl ester of a sodium or potassium sulfosuccinic acid, an alkyl amide sulfonate, a $C_{10}$–$C_{16}$ alkylsulfonate of sodium, potassium or ammonium, a mono- or di-ester of an alkyl phosphate, an ethoxylated alcohol $C_{8-16}$ fatty alcohol having 2 to 9 ethoxy groups, an alkyl- or aryl-sulfonate, a fatty ester sulfonate, a fluorosurfactant, or a mixture of any of the foregoing wherein the interdigitating means binds to the primary coating (b) by mechanical interdigitation and binds to the siliconic compound (c)(i) by physical or chemical interaction and thereby couples compound (c)(i) to the primary coating (b) and wherein the primary and top coatings are applied to the substrate without heat curing.

17. A coated article as recited in claim 16 wherein said siliconic compound (c)(i) comprises a polymer of the general formula:

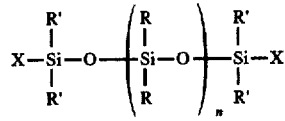

wherein R is a hydrocarbyl group, R' is alkyl or alkoxy, X is hydrocarbyl or an organic reactive site, and n is a number sufficient to provide that the polymer is a fluid or a water dispersible solid at 25° C.

18. A coated article as defined in claim 16 wherein the interdigitating means is polyoxyethylene (20)—sorbitan mono-oleate.

* * * * *